United States Patent
Steenkamer et al.

(10) Patent No.: US 11,724,516 B2
(45) Date of Patent: Aug. 15, 2023

(54) FAILING NOZZLE COMPENSATION AND NON-UNIFORMITY CORRECTION IN INKJET PRINTING

(71) Applicant: SPGPrints B.V., Boxmeer (NL)

(72) Inventors: Arnoldus Theodorus Steenkamer, Boxmeer (NL); Tom Tilly Norbert Lebouille, Boxmeer (NL); Petrus Leonardus Johannes Welten, Boxmeer (NL)

(73) Assignee: SPGPrints B.V., Boxmeer (NL)

( * ) Notice: Subject to any disclaimer, the term of this patent is extended or adjusted under 35 U.S.C. 154(b) by 59 days.

(21) Appl. No.: 17/607,535

(22) PCT Filed: May 27, 2020

(86) PCT No.: PCT/EP2020/064669
§ 371 (c)(1),
(2) Date: Oct. 29, 2021

(87) PCT Pub. No.: WO2020/239820
PCT Pub. Date: Dec. 3, 2020

(65) Prior Publication Data
US 2022/0219463 A1 Jul. 14, 2022

(30) Foreign Application Priority Data
May 27, 2019 (NL) .................................... 2023206

(51) Int. Cl.
B41J 29/393 (2006.01)
B41J 2/21 (2006.01)
G06K 15/02 (2006.01)

(52) U.S. Cl.
CPC ........... B41J 2/2139 (2013.01); B41J 2/2142 (2013.01); G06K 15/027 (2013.01)

(58) Field of Classification Search
CPC ...... B41J 2/2139; B41J 2/2146; B41J 29/393; B41J 2029/3935; G06K 15/027; H04N 1/6033; H04N 1/6041; H04N 1/6044
See application file for complete search history.

(56) References Cited

U.S. PATENT DOCUMENTS

2013/0293611 A1  11/2013  Ueshima
2016/0052300 A1*  2/2016  Ueshima .................... B41J 2/21
                                                              347/16

FOREIGN PATENT DOCUMENTS

EP    2 952 355 A1   12/2015
EP    3 332 968 A1    6/2018
JP    2013071289 A  *  4/2013  ............ B41J 2/2142

* cited by examiner

Primary Examiner — Julian D Huffman
(74) Attorney, Agent, or Firm — Hoffmann & Baron, LLP (57) ABSTRACT

A method and system for detecting one or more failing nozzles in an inkjet printhead of an inkjet printer for printing an image on a substrate and compensating failing nozzles, as well as for correcting colour uniformity of a printed image in inkjet printing an image on a substrate includes printing a first test pattern on a dedicated substrate, which is optically scanned and includes a system for the same. From the scan failing nozzles are identified, which are to be compensated by other nozzles. To these compensating nozzles compensated nozzle control data are allocated, which are used in printing a second test pattern that is also scanned and analysed for local deviations of colorimetric greyscale value. Corrected nozzle control data are allocated to the nozzles associated with the local deviation.

15 Claims, 4 Drawing Sheets

Fig. 1

Step 1: Print first test line pattern with each nozzle on dedicated test substrate Step 2: Scan first test line pattern printed on dedicated test substrate Step 3: Acquire status of status each nozzle from first test line pattern scan and determine compensated nozzle control data for nozzle neighbouring a failing nozzle Step 4: Print second test area pattern of different grey value using compensated nozzle control data on dedicated test substrate Step 5: Scan second test area pattern printed on dedicated test substrate Step 6: Determine corrected nozzle control data for local deviations of averaged grey value from second test area pattern scan Step 7: Perform print job using compensated nozzle control data and corrected nozzle control data

FAILING NOZZLE COMPENSATION AND NON-UNIFORMITY CORRECTION IN INKJET PRINTING

CROSS-REFERENCE TO RELATED APPLICATIONS

This application is the National Stage of International Application No. PCT/EP2020/064669, filed May 27, 2020, which claims the benefit of Netherlands Application No. 2023206, filed May 27, 2019, the contents of which is incorporated by reference herein.

FIELD OF THE INVENTION

The present invention relates to failing nozzle compensation and non-uniformity correction in inkjet printing, in particular a method and system for detecting one or more failing nozzles in an inkjet printhead of an inkjet printer for printing an image on a substrate and compensating therefor, as well as for correcting perceived non-uniformities caused by variations in ejected ink on a macroscopic level between different printheads and on a microscopic level for each nozzle.

BACKGROUND OF THE INVENTION

In inkjet printing the quality of the printed image is amongst others dependent on the performance of the nozzles of the inkjet printhead. If a nozzle does not perform according to predetermined specifications, the image quality is deteriorated. Deterioration may occur when a nozzle does not apply the required volume of inkjet ink on a specified position including the case where no ink is jetted at all, resulting in so called "white line" defects. Another anomaly occurs when the inkjet ink is applied to another position than the specified position, which may cause local intensity disturbances. These defects are visible to the human eye and disturb the appearance of the printed image. Sometimes these anomalies are caused by clogging of the nozzle. Whatever the cause of non- or malfunctioning, in the art such a nozzle is known as a "failing nozzle".

Various techniques and solutions for dealing with failing nozzles are known, wherein also the type of inkjet printer, either scanning and single pass, may be taken into account. In a scanning printer the printheads of the print colour bars carry out a reciprocal scanning movement in the width direction of the non-moving substrate, e.g. carried by driven carriages, during which the image is printed on the substrate. Thus during a stroke of the printhead in the width direction a nozzle prints along a line in the width direction of the substrate. Between subsequent strokes the substrate is conveyed in the length direction in order to position it for the next stroke of the printhead. In a multipass mode of a scanning printer an image part is printed on the substrate during multiple reciprocating strokes after which the substrate is moved. In a single pass mode of a scanning printer the image part is printed during one stroke. The print colour bars, that have perpendicular motion direction to the conveyance direction of the substrate, are considerably smaller than the maximum substrate width. A single pass printer having printheads in a fixed position comprises a configuration of one or more printheads having nozzles, such as a supporting beam carrying a plurality of adjacent printheads, which may be arranged in a staggered arrangement, which configuration extends at least over the width of the substrate to be printed. Typically the printheads are stationary arranged perpendicular to the machine direction. The substrate is passed continuously through the printer, e.g. temporarily fixed to a conveyor mechanism such as an endless belt, contrary to the intermittent conveyance of the substrate and reciprocal scanning movement of the printing heads in a scanning system. In a single pass system each position on the substrate is usually served by one nozzle of the printhead configuration for each process colour. A nozzle prints along a line in the length direction of the substrate.

One known technique for overcoming the problems and disadvantages of failing nozzles is to print a test pattern on a substrate, which is then analysed for failing nozzles, e.g. a picture of the printed test pattern is taken with a camera, from which picture a computer detects failing nozzles and compensating is performed by attenuation using dedicated algorithms. Failing nozzles are typically disabled and compensated for by allocating additional ink to be supplied by one or more (directly) neighbouring nozzles during actual printing.

E.g. from EP2952355A1 a compensation method is known, wherein at least two compensation mechanisms are used, one wherein a density deficit compensation associated with a failing nozzle is transferred to neighbouring nozzles (of the same colour) and one wherein a density deficit compensation associated with a failing nozzle is transferred to a corresponding nozzle of a printhead of a different colour. According to an embodiment the densities and densities deficits are established optically by an inline arrangement of an optical capturing device that captures an output of the printing process.

From EP3332968A1 a test pattern for detecting failing nozzles of an inkjet printer and in case of relevance for the image to be printed compensation thereof is known. The test pattern comprises a specially arranged line area in order to identify failing nozzles and a second area having different greyscales to be printed by overprinting a plurality of process colours. The printed test pattern is measured by means of an optical sensor, which preferably is an RGB camera.

One of the drawbacks of the presently used cameras is their broad width of view, which is very large compared to the printed test patterns, which complicates the detection of the failing nozzles and deteriorates the accuracy of the compensation to be applied. In line arrangement of a camera may also suffer from varying light and reflection conditions from the environment during capturing that affect the picture taken and thus subsequent analysis and compensation.

It also has appeared that typically each printhead possesses its own minimal but visible difference in ink volume that is applied per nozzle for a given colorimetric grey level, which appear as visible strips having a varying intensity, in the printing direction. Although printing with failing nozzle compensation improves the uniformity for the colorimetric grey levels, further correction of this non-uniformity footprint of a printhead is desired. Again the width of view of a camera is too large compared to these strips having varying density per grey level.

SUMMARY OF THE INVENTION

It is an object of the invention to provide a method and system for dealing with failing nozzles in an inkjet printer that allow for an accurate compensation and/or non-uniform grey level correction thereby making it possible to improve the quality of the image to be printed using nozzle data that have been compensated and/or corrected, or at least to provide such a suitable alternative method and system.

In a first aspect the invention provides a method for detecting one or more failing nozzles in an inkjet printhead of an inkjet printer for printing an image on a substrate and compensating failing nozzles, as well as for correcting colour uniformity of a printed image in inkjet printing an image on a substrate,
which method comprises:
a first printing step of printing a first test pattern on a test substrate having a receiving layer adapted to the nature of the inkjet ink by jetting inkjet ink from an inkjet printhead of the inkjet printer, wherein each nozzle of the inkjet printhead is controlled to print at least one line;
a first scanning step of scanning the printed first test pattern using a scanner having a resolution at least equal to that of the inkjet printhead, thereby obtaining a first test pattern scan of the printed first test pattern;
a first computing step of acquiring the nozzle status of each nozzle from the first test pattern scan and determining compensation factors for failing nozzles thus identified, thereby obtaining compensated nozzle control data;
a second printing step of printing a second test pattern on a test substrate having a receiving layer adapted to the nature of the inkjet ink, by jetting inkjet ink from an inkjet printhead of the inkjet printer, which is controlled using the compensated nozzle control data, wherein the second test pattern comprises at least two areas, each area having a different greyscale;
a second scanning step of scanning the printed second test pattern using the scanner having a resolution at least equal to that of the inkjet printhead, thereby obtaining a second test pattern scan of the printed second test pattern;
a second computing step of analysing the second test pattern scan in each of the at least two areas having a different greyscale for local deviations from the greyscale of the respective area and determining correction factors for local deviations thus identified for each of the greyscales, thereby obtaining corrected nozzle control data for the respective greyscale.

The method according to the invention comprises the detection and compensation of malfunctioning nozzles, which cause line defects in the printed first test pattern that are detectable by a computer from the first test pattern scan. In the invention this first test pattern is printed on a dimensionally stable test substrate, such as a white plastic film sheet, e.g. made from PP, which is provided with a receiving layer compatible with the type of the inkjet ink used, such as water based inkjet inks or UV inkjet inks. Then the printed substrate is transferred to the scanner, where the printed test substrate is optically scanned. The scanner has a resolution at least equal to the resolution of the printhead that is being screened, e.g. 1200 dpi. Due to the receiving layer the printed test pattern is clearly readable by the scanner having the appropriate resolution enabling to distinguish the individual nozzles upon processing the scan. The digital first test pattern scan thus obtained is analysed and the status of each nozzle is determined and failing nozzles are identified. Compensation for the failing nozzles is determined using suitable algorithms, e.g. by de-activating these failing nozzles and establishing compensation factors for the (directly) neighbouring nozzles in the inkjet printhead as compensated nozzle control data, which are supplied to the controller of the inkjet printer. Subsequently using the thus generated compensated nozzle control data the second test pattern comprising areas of different colorimetric greyscales is printed on a fresh dedicated test substrate. The test substrate thus printed with the second test pattern is scanned producing a second test pattern scan. For each area of a given colorimetric greyscale the average value is determined. Local deviations with respect to this average value are determined, correction factors for the nozzles associated with the local deviation are applied and thus corrected nozzle control data are generated. This is done for each of the areas of different colorimetric greyscales. Typically the first and second test pattern comprise such line and area subpatterns for all the process colours. The second test pattern comprises areas having grey levels of e.g. 90, 80, 60 and 30%. Generally the test patterns, in particular the second test pattern, comprise also indications for printhead alignment and nozzle position determination, which enables to allocate a local greyscale variation within the area of a specific greyscale to a certain nozzle position.

If the dimensions of the test substrate are larger than the scanner bed, which is more likely to occur in single pass printing than in scanning printing, stitching of scans of parts of the printed test pattern could be included in the computing steps.

Thereafter the inkjet printer can carry out a print job of printing a high quality image using the compensated and corrected nozzle control data, allowing to print fine structures, e.g. geometrical designs, simultaneously with larger uniform areas of a single or mixed colour. Colour addressability and fine tonal gradients in the printed image are also improved. In addition to the high quality prints that can be made using the method of the invention additional advantages include extended usage time of the print heads by regularly e.g. once a week performing the method according to the invention thereby avoiding premature replacement of a malfunctioning printhead. The improved image quality also allows to increase the productivity ($m^2$/h). The performance of each printhead can be recorded during the method of the invention, and e.g. accessed remotely, offering effective remote support and recommendation opportunities to the operating staff.

Advantageously the compensation factor and correction factors for a working nozzle are presented as the additional volume of inkjet ink to be jetted by said working nozzle, which could be a negative number. Similarly the compensated nozzle control data and/or corrected nozzle control data are presented as the additional number of inkjet ink droplets to be jetted by the respective nozzle, which also could be negative.

The method according to the invention is applicable to both scanning and single pass inkjet printers. Using the method according to the invention in scanning inkjet printers allows to perform a major part of print jobs in a more productive mode, e.g. printing an image during a single pass instead of during multiple passes. The effect of single pass printing is an optimal colour to colour registration. Using the method according to the invention in single pass inkjet printers having fixed printheads allows primarily to improve the uniformity. While scanning printers due to the multiple reciprocating movement of the printhead can offer other methods of compensating failing nozzles, single pass inkjet printers profit the most from the invention.

Advantageously the scanner is provided with two-sided RGB illumination.

It has appeared that in some process colours and at higher grey values e.g. 80% and 95%, oversaturation could occur. One cause thereof may be the illumination in the scanner, which results in local deviations being indistinguishable in the computing steps. In an embodiment the method comprises a third printing step of printing a third test pattern on the test substrate having a receiving layer adapted to the nature of the inkjet ink, by jetting inkjet ink from an inkjet printhead of the inkjet printer, which is controlled using the compensated nozzle data and corrected nozzle data, wherein the third test pattern comprises at least two areas having the same greyscale, of which a first area is printed by non-neighbouring nozzles, such as the odd numbers of the nozzles, of the inkjet printhead and a second area is printed by other non-neighbouring nozzles, such as the even numbered nozzles, of the inkjet printhead; a third scanning step of scanning the printed third test pattern using the scanner having a resolution at least equal to that of the inkjet printhead, thereby obtaining a third test pattern scan of the printed third test pattern;

a third computing step of analysing the third test pattern scan in each of the at least two areas having the same greyscales for local deviations from the greyscale of the respective area and determining additional correction factors for local deviations thus identified for each of the greyscales, thereby obtaining additionally corrected nozzle control data for the respective greyscale.

By dividing the nozzles of the printhead in groups, wherein neighbouring nozzles are allocated to different groups, the printed area of high colorimetric grey value appears "lighter" and therefore better readable by the scanner.

Advantageously the third test pattern comprising at least two areas having the same greyscale, of which a first area is to be printed by non-neighbouring nozzles, such as the odd numbers of the nozzles, of the inkjet printhead and a second area is to be printed by other non-neighbouring nozzles, such as the even numbered nozzles, of the inkjet printhead, if present, is added to the second test pattern and the second computing step incorporated also analyses the second test pattern scan in each of the at least two areas having the same greyscales for local deviations from the greyscale of the respective area and determining additional correction factors for local deviations thus identified for each of the greyscales, thereby obtaining additionally corrected nozzle control data for the respective greyscale.

According to a second aspect the invention relates to a system for detecting one or more failing nozzles in an inkjet printhead of an inkjet printer for printing an image on a substrate and compensating failing nozzles, as well as for correcting colour uniformity of a printed image in inkjet printing an image on a substrate, comprising
an inkjet printer having at least one printhead with nozzles provided with a controller configured for controlling the nozzles of the at least one inkjet printhead,
a computer configured to compensate failing nozzles in an inkjet printhead of the inkjet printer from a test pattern scan resulting in compensated nozzle control data for the controller and configured to correct colour uniformity from a test pattern scan resulting in corrected nozzle control data for the controller,
a scanner having a resolution at least equal to the resolution of the printhead, and a test substrate having a receiving layer adapted to the nature of the inkjet ink. Preferably the number of test substrates is at least the sum of the number of process colours of the printer (one test substrate for printing the second test pattern for each process colour) plus one (for printing simultaneously the first test pattern for all process colours).

In yet another aspect the invention relates to an inkjet printer for printing an image on a substrate having at least one inkjet printhead with nozzles, a controller configured for controlling the nozzles of the at least one printhead and a computer configured to compensate failing nozzles in an inkjet printhead of the inkjet printer from a test pattern scan resulting in compensated nozzle control data for the controller and configured to correct colour uniformity from a test pattern scan resulting in corrected nozzle control data for the controller, obviously intended for use in the method or system according to the invention.

This system configured to perform the method according to the invention as explained above, as well as the inkjet printer offer the same advantages as explained above for the method according to the invention. The controller is typically also configured to inkjet print the first and second test pattern, and optionally the third test pattern as identified above. Thus the controller is configured to print a first test pattern of at least one line per nozzle on a test substrate having a receiving layer adapted to the nature of the inkjet ink, by jetting inkjet ink from an inkjet printhead of the inkjet printer; and configured to print a second test pattern comprising at least two areas, each area having a different greyscale, on a test substrate having a receiving layer adapted to the nature of the inkjet ink, by jetting inkjet ink from an inkjet printhead of the inkjet printer, using the compensated nozzle control data; and configured to print an image by jetting inkjet ink from an inkjet printhead of the inkjet printer using the compensated nozzle control data and corrected nozzle control data.

In a further aspect the invention relates to an inkjet printing method of inkjet printing an image on a substrate, comprising jetting inkjet ink from an inkjet printhead of the inkjet printer having a controller, which is controlled by the controller using the compensated control nozzle data and corrected control nozzle data and/or additionally corrected control nozzle data obtained by the method according to the invention.

BRIEF DESCRIPTION OF THE DRAWINGS

The invention is further illustrated in the drawings, wherein.

DETAILED DESCRIPTION OF THE INVENTION

Figure 1:
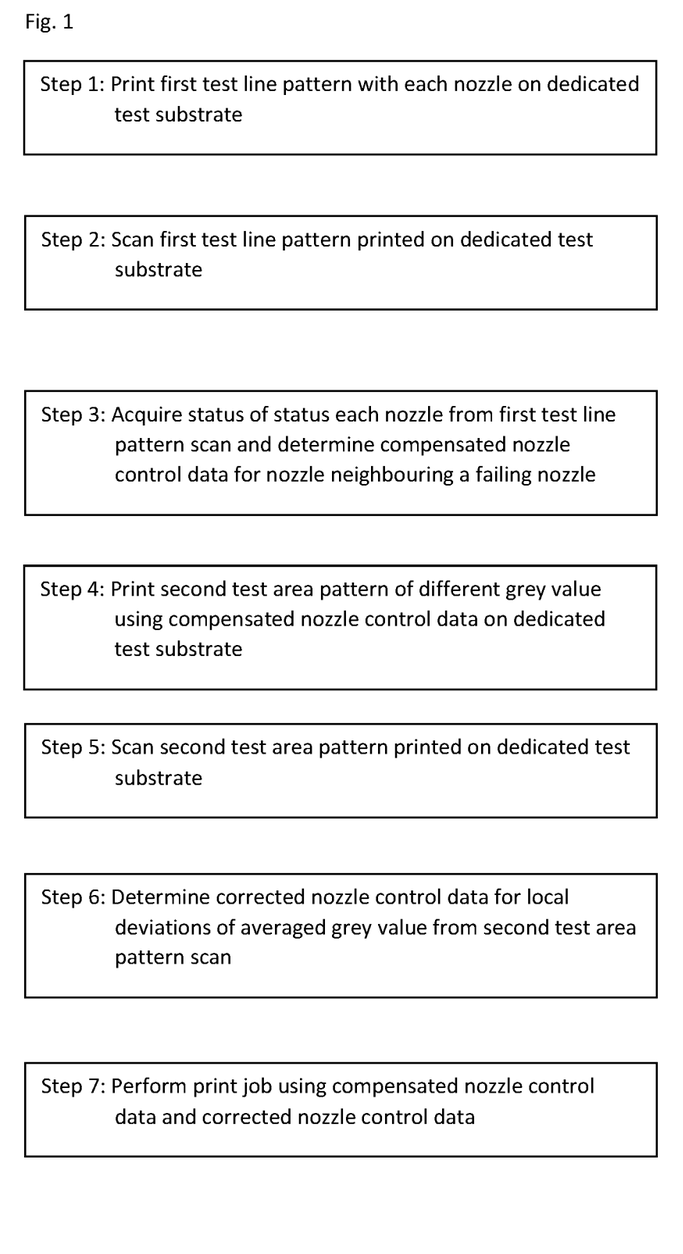
FIG. 1 shows a flow diagram of an embodiment of the method according to the invention.

FIG. 1 is a flow diagram of an embodiment of the method according to the invention, which can be used in both scanning printing and single pass printing. In step 1 a first test line pattern is printed using each nozzle on the test substrate having a receiving layer that is compatible with the inkjet ink used. The test substrate having the first test line pattern printed onto the receiving layer is scanned in step 2, thereby producing a digital scan of the printed first test line pattern. In step 3 the produced digital scan is analysed and the status of each nozzle is determined. A nozzle may be classified as a failing nozzle if the detected defects related to this nozzle exceed a certain threshold. To a failing nozzle thus identified appropriate nozzle control data that deactivate this nozzle are allocated. In order to compensate the failing nozzle compensation factors are allocated to neighbouring nozzles thereby generating compensated nozzle control data for these neighbouring nozzles. These failing nozzle and compensated nozzle control data are recorded and supplied to or read by the controller of the inkjet printer. Using these fresh control data the second test pattern having areas of different colorimetric grey value is printed on the receiving layer of a new dedicated test substrate in the following step 4. In step 5 a scan of the printed second test pattern is made, which digital second test pattern scan is further processed in step 6. In this step the average colorimetric greyscale of a printed area is determined and local deviations from the average are also determined. Generally for each process colour of the printer the second test pattern is printed on a separate test substrate. In order to improve the colour uniformity correction factors for the nozzles associated with a local deviation are allocated to these nozzles, thereby generating corrected nozzle control data. Again a threshold may be incorporated in this determination and allocation process. The corrected nozzle control data are also recorded and are thus available for use by the controller of the inkjet printer in a subsequent print job as shown in step 7.

A third test pattern of areas having the same colorimetric greyscale but to be printed by selected groups of non-neighbouring nozzles may be integrated into the second test pattern. As an alternative such a third test pattern may be printed on a dedicated test substrate in a third printing step using the compensated and corrected nozzle control data, which printed substrate is scanned and analysed as explained in order to generate additionally corrected nozzle control data. Thereafter a print job is performed using the compensated and (additionally) corrected control nozzle data.

Figure 2:
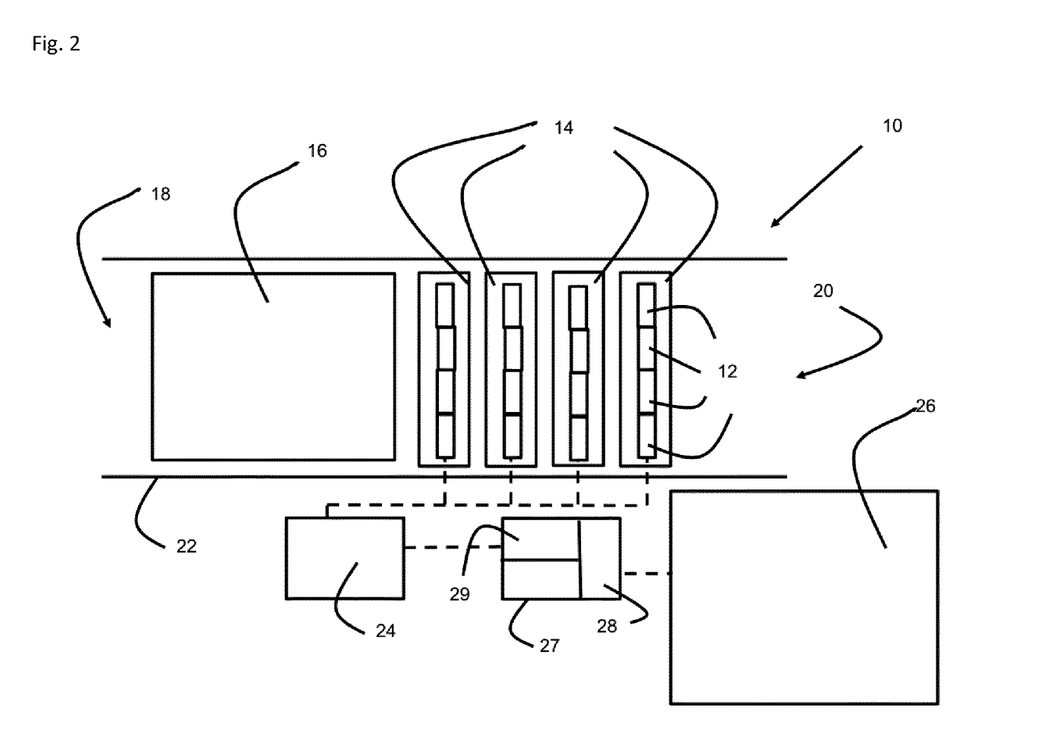
FIG. 2 schematically shows an embodiment of a system according to invention.

FIG. 2 shows an embodiment of a system according to the invention. The system comprises a an inkjet printer 10, in this embodiment a single pass inkjet printer having an array of inkjet printheads 12 for each process colour, e.g. basic colours YMCK. The printheads 12 are stationary arranged on a supporting beams 14. The nozzles of the printheads 12, perpendicular arranged to the machine direction, extend at least over the width of the substrate to be printed. A staggered configuration of the printheads 12 is feasible. A test substrate to be used for screening the printheads 12 for failing nozzles is indicated by reference numeral 16. This test substrate 16 is conveyed through the inkjet printer 10 from a feed 18 to an outlet 20, e.g. temporarily adhered to a conveyor belt 22. The inkjet printer 10 is provided with a controller 24 that is configured to control the nozzles of the printheads 12. A scanner 26 is configured to scan the test substrate 16 that has been printed by a test pattern. The digital scan of the test pattern is processed by computer 27 having a processor 28 which is configured to identify individual failing nozzles from the digital scan of the first test pattern and allocate compensation factors to the nozzles neighbouring a failing nozzle. Compensated nozzle control data computed from these compensation factors are recorded e.g. in memory 29 of computer 27 and subsequently used by the controller 24 for printing the second test pattern on a test substrate 16, which is also scanned by the scanner 26. The computer 27 is also configured to calculate an average grey value for each of the areas that have mutually distinct greyscales, and to compare local values to identify local spots having a deviating greyscale and to allocate uniformity correction factors to the nozzles in these local spots and generating uniformity corrected nozzle control data for those nozzles associated to the local deviating spot. Also these data are recorded and transferred to the controller 24 and used for performing an actual print job.

Figure 3:
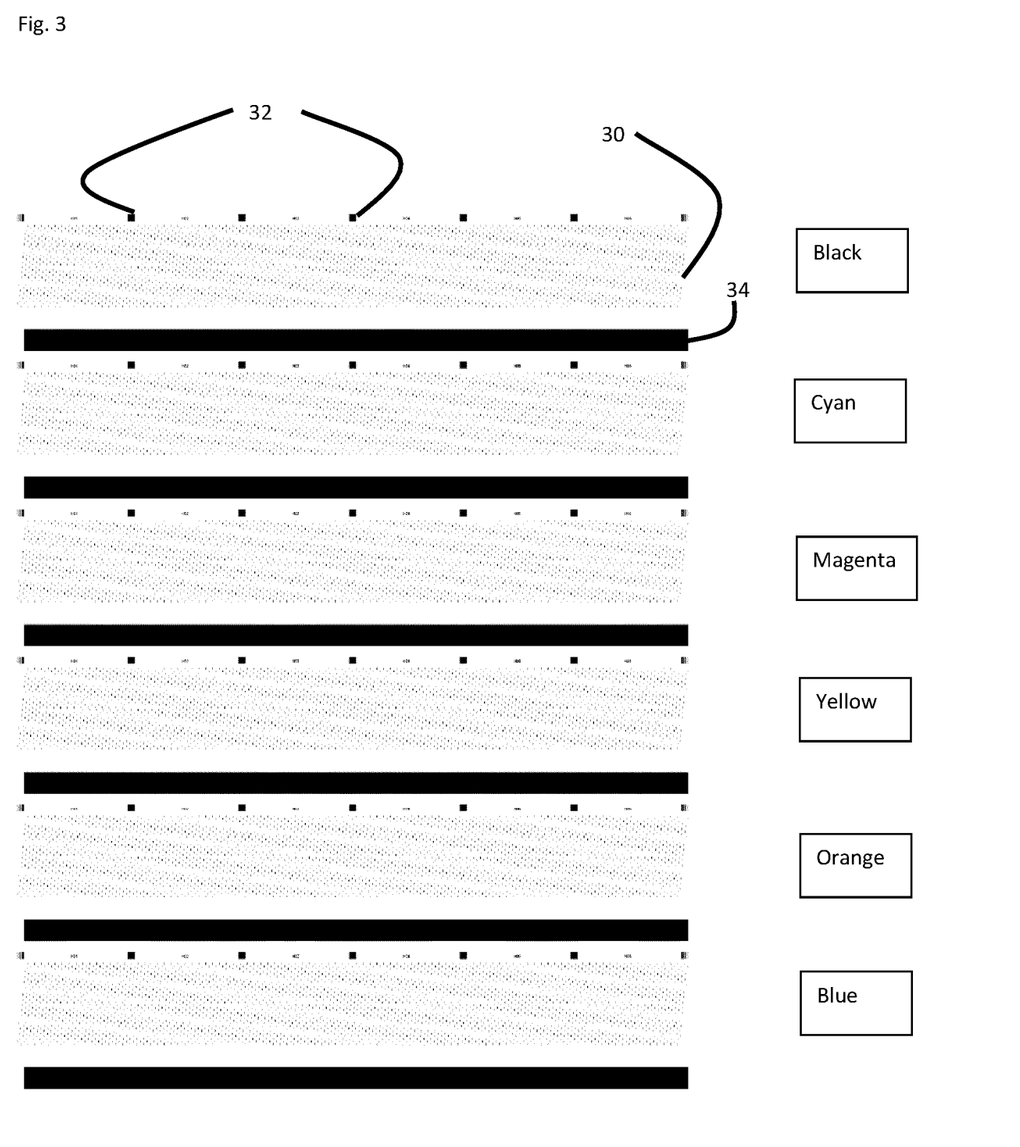
FIG. 3 is an example of a printed first test pattern.

A diagrammatically drawn example of a printed first test pattern having lines to be printed by each nozzle for each colour is shown in FIG. 3. The line pattern covering the full width of the array of printheads 12 is shown at 30. Squares 32 and strips 34 are marks for the position of the respective printheads (and thus the position of the nozzles) and for alignment thereof.

Figure 4:
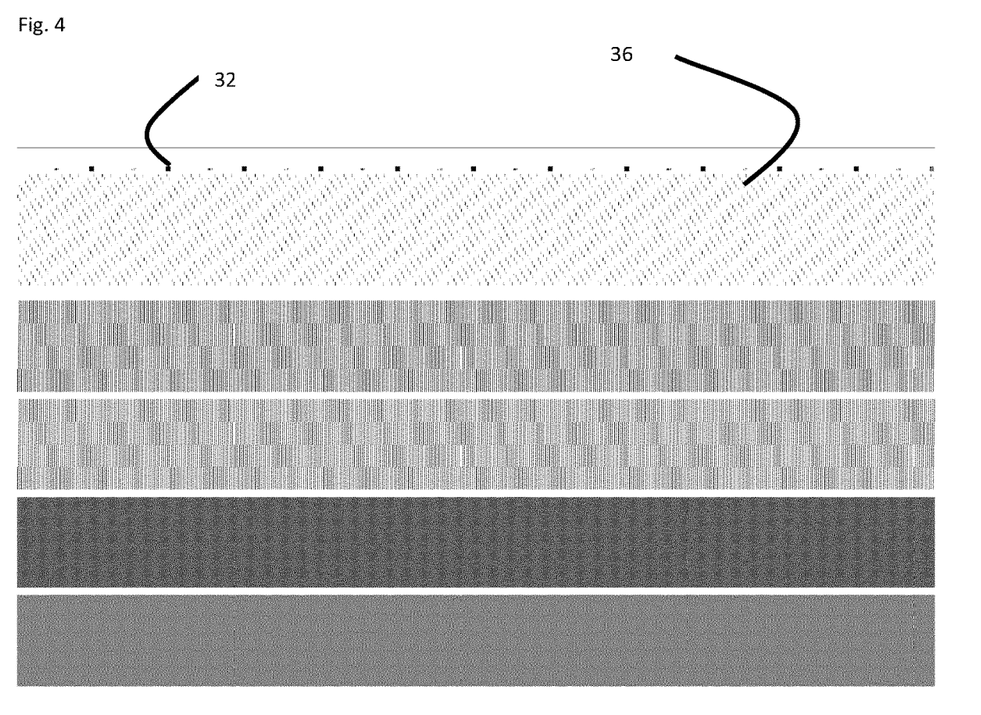
FIG. 4 is an example of a printed second test pattern.

FIG. 4 shows a diagrammatically represented example of a printed second test pattern 36 for a colour having areas or strips of differing grey levels.

The invention claimed is:

1. A method for detecting one or more failing nozzles in an inkjet printhead of an inkjet printer for printing an image on a substrate and compensating failing nozzles, as well as for correcting colour uniformity of a printed image in inkjet printing an image on a substrate, which method comprises:
a first printing step of printing a first test pattern on a test substrate having a receiving layer adapted to the nature of the inkjet ink by jetting inkjet ink from an inkjet printhead of the inkjet printer, wherein each nozzle of the inkjet printhead is controlled to print at least one line;
a first scanning step of scanning the printed first test pattern using a scanner having a resolution at least equal to that of the inkjet printhead, thereby obtaining a first test pattern scan of the printed first test pattern;
a first computing step of acquiring the nozzle status of each nozzle from the first test pattern scan and determining compensation factors for failing nozzles thus identified, thereby obtaining compensated nozzle control data;
a second printing step of printing a second test pattern on a test substrate having a receiving layer adapted to the nature of the inkjet ink, by jetting inkjet ink from an inkjet printhead of the inkjet printer, which is controlled using the compensated nozzle control data, wherein the second test pattern comprises at least two areas, each area having a different greyscale;
a second scanning step of scanning the printed second test pattern using the scanner having a resolution at least equal to that of the inkjet printhead, thereby obtaining a second test pattern scan of the printed second test pattern;
a second computing step of analysing the second test pattern scan in each of the at least two areas having a different greyscale for local deviations from the greyscale of the respective area and determining correction factors for local deviations thus identified for each of the greyscales, thereby obtaining corrected nozzle control data for the respective greyscale;
wherein the second pattern also comprises at least two areas having the same greyscale, of which a first area is printed by non-neighbouring nozzles of the inkjet printhead and a second area is printed by other non-neighbouring nozzles of the inkjet printhead; and
wherein the second computing step also comprises analysing from the second test pattern scan in each of the at least two areas having the same greyscales for local deviations from the greyscale of the respective area and determining additional correction factors for local deviations thus identified for each of the greyscales, thereby obtaining additionally corrected nozzle control data for the respective greyscale.

2. The method according to claim 1, wherein the compensation factors and/or correction factors are presented as an additional volume of inkjet ink to be jetted by a nozzle.

3. The method according to claim 1, wherein the compensated nozzle control data and/or corrected nozzle control data are presented as an additional number of inkjet ink droplets to be jetted by a nozzle.

4. The method according to claim 1, wherein the test substrate is a rigid, preferably white, plastic film having a receiving layer.

5. An inkjet printing method of inkjet printing an image on a substrate, comprising jetting inkjet ink from an inkjet printhead of the inkjet printer having a controller, which jetting is controlled by the controller using the compensated control nozzle data and corrected control nozzle data and additionally corrected control nozzle data obtained by the method according to claim 1.

6. A method for detecting one or more failing nozzles in an inkjet printhead of an inkjet printer for printing an image on a substrate and compensating failing nozzles, as well as for correcting colour uniformity of a printed image in inkjet printing an image on a substrate,
which method comprises:
a first printing step of printing a first test pattern on a test substrate having a receiving layer adapted to the nature of the inkjet ink by jetting inkjet ink from an inkjet printhead of the inkjet printer, wherein each nozzle of the inkjet printhead is controlled to print at least one line;
a first scanning step of scanning the printed first test pattern using a scanner having a resolution at least equal to that of the inkjet printhead, thereby obtaining a first test pattern scan of the printed first test pattern;
a first computing step of acquiring the nozzle status of each nozzle from the first test pattern scan and determining compensation factors for failing nozzles thus identified, thereby obtaining compensated nozzle control data;
a second printing step of printing a second test pattern on a test substrate having a receiving layer adapted to the nature of the inkjet ink, by jetting inkjet ink from an inkjet printhead of the inkjet printer, which is controlled using the compensated nozzle control data, wherein the second test pattern comprises at least two areas, each area having a different greyscale;
a second scanning step of scanning the printed second test pattern using the scanner having a resolution at least equal to that of the inkjet printhead, thereby obtaining a second test pattern scan of the printed second test pattern;
a second computing step of analysing the second test pattern scan in each of the at least two areas having a different greyscale for local deviations from the greyscale of the respective area and determining correction factors for local deviations thus identified for each of the greyscales, thereby obtaining corrected nozzle control data for the respective greyscale;
a third printing step of printing a third test pattern on the test substrate having a receiving layer adapted to the nature of the inkjet ink, by jetting inkjet ink from an inkjet printhead of the inkjet printer, which is controlled using the compensated nozzle data and corrected nozzle data, wherein the third test pattern comprises at least two areas having the same greyscale, of which a first area is printed by non-neighbouring nozzles of the inkjet printhead and a second area is printed by other non-neighbouring nozzles of the inkjet printhead;
a third scanning step of scanning the printed third test pattern using the scanner having a resolution at least equal to that of the inkjet printhead, thereby obtaining a third test pattern scan of the printed third test pattern;
a third computing step of analysing from the third test pattern scan in each of the at least two areas having the same greyscales for local deviations from the greyscale of the respective area and determining additional correction factors for local deviations thus identified for each of the greyscales, thereby obtaining additionally corrected nozzle control data for the respective greyscale.

7. The method according to claim 6, wherein the compensation factors and/or correction factors are presented as an additional volume of inkjet ink to be jetted by a nozzle.

8. The method according to claim 6, wherein the compensated nozzle control data and/or corrected nozzle control data are presented as an additional number of inkjet ink droplets to be jetted by a nozzle.

9. The method according to claim 6, wherein the test substrate is a rigid, plastic film having a receiving layer.

10. An inkjet printing method of inkjet printing an image on a substrate, comprising jetting inkjet ink from an inkjet printhead of the inkjet printer having a controller, which jetting is controlled by the controller using the compensated control nozzle data and corrected control nozzle data and additionally corrected control nozzle data obtained by the method according to claim 6.

11. A system for detecting one or more failing nozzles in an inkjet printhead of an inkjet printer for printing an image on a substrate and compensating failing nozzles, as well as for correcting colour uniformity of a printed image in inkjet printing an image on a substrate, comprising:
an inkjet printer having at least one printhead with nozzles provided with a controller configured for controlling the nozzles of the at least one inkjet printhead,
a computer configured to compensate failing nozzles in an inkjet printhead of the inkjet printer from a test pattern scan resulting in compensated nozzle control data for the controller and configured to correct colour uniformity from a test pattern scan resulting in corrected nozzle control data for the controller and configured to correct oversaturation from a test pattern resulting in additionally corrected nozzle control data,
a scanner having a resolution at least equal to the resolution of the printhead, and
a test substrate having a receiving layer adapted to the nature of the inkjet ink, wherein:
the controller is configured to print a first test pattern of at least one line per nozzle on a test substrate having a receiving layer adapted to the nature of the inkjet ink, by jetting inkjet ink from an inkjet printhead of the inkjet printer; and
the controller is configured to print a second test pattern comprising at least two areas, each area having a different greyscale, on a test substrate having a receiving layer adapted to the nature of the inkjet ink, by jetting inkjet ink from an inkjet printhead of the inkjet printer, using the compensated nozzle control data; and
the controller is configured to print a third test pattern comprising at least two areas having the same greyscale, of which a first area is to be printed by non-neighbouring nozzles and a second area is to be printed by other non-neighbouring nozzles, on a test substrate having a receiving layer adapted to the nature of the inkjet ink, by jetting inkjet ink from an inkjet printhead of the inkjet printer using the compensated nozzle data and corrected nozzle data and configured to print an image by jetting inkjet ink from an inkjet printhead of the inkjet printer using the additionally corrected nozzle control data.

12. The system according to claim 11, wherein the number of test substrates is at least the sum of the number of process colours of the printhead plus two, having a receiving layer adapted to the nature of the inkjet ink.

13. A system for detecting one or more failing nozzles in an inkjet printhead of an inkjet printer for printing an image on a substrate and compensating failing nozzles, as well as for correcting colour uniformity of a printed image in inkjet printing an image on a substrate, comprising
- an inkjet printer having at least one printhead with nozzles provided with a controller configured for controlling the nozzles of the at least one inkjet printhead,
- a computer configured to compensate failing nozzles in an inkjet printhead of the inkjet printer from a test pattern scan resulting in compensated nozzle control data for the controller and configured to correct colour uniformity from a test pattern scan resulting in corrected nozzle control data for the controller and configured to correct oversaturation from a test pattern resulting in additionally corrected nozzle control data,
- a scanner having a resolution at least equal to the resolution of the printhead, and
- a test substrate having a receiving layer adapted to the nature of the inkjet ink;

wherein:
the controller is configured to print a first test pattern of at least one line per nozzle on a test substrate having a receiving layer adapted to the nature of the inkjet ink, by jetting inkjet ink from an inkjet printhead of the inkjet printer; and the controller is configured to print a second test pattern comprising at least two areas, each area having a different greyscale, and at least two areas having the same greyscale, of which a first area is to be printed by non-neighbouring nozzles and a second area is to be printed by other non-neighbouring nozzles, on a test substrate having a receiving layer adapted to the nature of the inkjet ink, by jetting inkjet ink from an inkjet printhead of the inkjet printer, using the compensated nozzle control data; and the controller is configured to print an image by jetting inkjet ink from an inkjet printhead of the inkjet printer using the compensated nozzle control data and corrected nozzle control data.

14. The system according to claim 13, wherein the number of test substrates is at least the sum of the number of process colours of the printhead plus two, having a receiving layer adapted to the nature of the inkjet ink.

15. The system according to claim 13, wherein the number of test substrates is at least the sum of the number of process colours of the printhead plus one, each having a receiving layer adapted to the nature of the inkjet ink.

* * * * *